(12) United States Patent
Hofmann et al.

(10) Patent No.: US 12,488,497 B2
(45) Date of Patent: Dec. 2, 2025

(54) LOCALIZING AN OPTICAL MARKER

(71) Applicant: SICK AG, Waldkirch (DE)

(72) Inventors: Christoph Hofmann, Waldkirch (DE); Alfred Arockiaraj, Waldkirch (DE)

(73) Assignee: SICK AG, Waldkirch (DE)

( * ) Notice: Subject to any disclaimer, the term of this patent is extended or adjusted under 35 U.S.C. 154(b) by 222 days.

(21) Appl. No.: 18/241,494

(22) Filed: Sep. 1, 2023

(65) Prior Publication Data

US 2024/0078697 A1 Mar. 7, 2024

(30) Foreign Application Priority Data

Sep. 2, 2022 (EP) .................................. 22193749

(51) Int. Cl.
*A61B 5/00* (2006.01)
*G06T 7/73* (2017.01)
(Continued)

(52) U.S. Cl.
CPC ............... *G06T 7/73* (2017.01); *G06T 7/85* (2017.01); *H04N 13/239* (2018.05);
(Continued)

(58) Field of Classification Search
CPC ......... G06T 7/73; G06T 7/85; G06T 2200/04; G06T 2207/10012; G06T 2207/10024;
(Continued)

(56) References Cited

U.S. PATENT DOCUMENTS 10,582,121 B2 * 3/2020 Kamilov .................. G01S 13/89
2011/0025827 A1 2/2011 Shpunt et al.
(Continued)

FOREIGN PATENT DOCUMENTS

DE 102005028490 B4 11/2012
EP 1933167 A2 6/2008
(Continued)

OTHER PUBLICATIONS

Um, et al.; "Three-dimensional Scene Reconstruction Using Multi-view Images and Depth Camera", Stereoscopic Displays and Virtual Reality Systems XII, edited by Andrew J. Woods, Mark T. Bolas, John O. Merritt, Ian E. McDowall, Proc. of SPIE-IS& T Electronic Imaging, SPIE vol. 5664 © 2005, Downloaded from SPIE Digital Library on Mar. 11, 2010.

(Continued)

*Primary Examiner* — Howard D Brown, Jr.
(74) *Attorney, Agent, or Firm* — Nath, Goldberg & Meyer; Jerald L. Meyer; Stanley N. Protigal (57) ABSTRACT

A camera device for localizing an optical marker is provided that has at least one image sensor and a control and evaluation unit. A first camera channel for recording first image data having the optical marker is formed from the image sensor and the control and evaluation unit. The control and evaluation unit is configured to locate the optical marker in the first image data and to determine a first pose of the optical marker relative to the camera device. A second camera channel for recording second image data having the optical marker is formed from the image sensor and the control and evaluation unit. The control and evaluation unit is configured to locate the optical marker in the second image data, to determine a second pose of the optical marker relative to the camera device, and to compare the first pose and the second pose with one another.

19 Claims, 5 Drawing Sheets

(51) Int. Cl.
  *G06T 7/80* (2017.01)
  *H04N 13/239* (2018.01)
  *H04N 13/246* (2018.01)
  *G01S 17/86* (2020.01)
  *G01S 17/894* (2020.01)
(52) U.S. Cl.
  CPC ............ *H04N 13/246* (2018.05); *G01S 17/86* (2020.01); *G01S 17/894* (2020.01); *G06T 2200/04* (2013.01); *G06T 2207/10012* (2013.01); *G06T 2207/10024* (2013.01); *G06T 2207/30204* (2013.01)
(58) Field of Classification Search
  CPC . G06T 2207/30204; G06T 2207/10021; G06T 2207/10028; H04N 13/239; H04N 13/246; G01S 17/86; G01S 17/894
  See application file for complete search history.

(56) References Cited

U.S. PATENT DOCUMENTS

| | | | | |
|---|---|---|---|---|
| 2017/0319143 | A1* | 11/2017 | Yu | A61B 5/682 |
| 2018/0012370 | A1* | 1/2018 | Aghamohammadi | G06F 18/251 |
| 2018/0345498 | A1 | 12/2018 | Müncher | |
| 2019/0364206 | A1* | 11/2019 | Dal Mutto | G06T 7/73 |
| 2020/0121245 | A1* | 4/2020 | Barclay | A61B 5/7275 |
| 2021/0134013 | A1* | 5/2021 | Carlsson | H04N 13/246 |
| 2021/0383551 | A1 | 12/2021 | Fiala | |
| 2021/0398316 | A1* | 12/2021 | Panse | G06T 19/006 |
| 2024/0314289 | A1* | 9/2024 | Liu | G06T 7/85 |

FOREIGN PATENT DOCUMENTS

| | | | | |
|---|---|---|---|---|
| EP | 3734423 A1 | 11/2020 | | |
| WO | WO-2016094109 A2 * | 6/2016 | ........... | H04N 13/246 |
| WO | WO-2019030235 A1 * | 2/2019 | ............... | G06T 7/33 |

OTHER PUBLICATIONS

Shabalina, et al.; "Comparing Fiducial Markers Performance for a Task of a Humanoid Robot Self-Calibration of Manipulators: a Pilot Experimental Study"; Laboratory of Intelligent Robotic Systems, Kazan Federal University Kazan 420008, Russian Federation; Jan. 2018.

* cited by examiner

LOCALIZING AN OPTICAL MARKER

FIELD

The invention relates to a camera device and to a method for localizing an optical marker.

BACKGROUND

The determination of a pose, for instance that of a robot or of a vehicle, is a necessity in a number of important applications of machine vision (computer vision). Examples include navigation or augmented reality. It is necessary to locate correspondences between the recorded 2D projection and the real 3D projection to estimate a pose from a camera image. This is extremely challenging and susceptible to error.

Artificial optical markers can simplify this process and improve robustness. This in particular applies to so-called fiducial markers that provide sufficient features to reconstruct the pose. In the simplest case, the features are the four corners of the marker, with additional robustness, including the possibility of error recognition, being able to be provided by further internal features of the marker.

A known vision system based on fiducial markers is AprilTag, see https://april.eecs.umich.edu/software/apriltag.html, including a list of literature shown there. It comprises a library implemented in C having inter alia functions for determining the 3D position, orientation, and identity of the markers. An alternative is ArUco with a tutorial at https://docs.opencv.org/4.x/d5/dae/tutorial_aruco_detection.html VUMarks provides a further class of special artificial markers, see https://library.vuforia.com/objects/vumarks. The paper by Shabalina et al. "Comparing fiducial markers performance for a task of a humanoid robot self-calibration of manipulators: A pilot experimental study", International Conference on Interactive Collaborative Robotics, Springer, Cham, 2018, describes a practical study with different fiducial markers.

Even though optical markers accordingly considerably improve the reliability with regard to markerless systems, the special demands of safety engineering are by no means satisfied by them when the camera device therefore is intended to safeguard a machine to avoid accidents with persons. Such a safe camera device has to be configured in accordance with relevant safety standards, for example the standard IEC/EN 13849 for machine safety, the standard IEC/EN 61508 for functional safety, or the machine standard IEC/EN 61496 for electrosensitive protective equipment (ESPE). Certain safety levels are achieved in accordance with such standards, for instance Safety Integrity Levels (SILs) in accordance with IEC 61508 or Performance Level (PL) in accordance with IEC 13849, depending on the remaining residual risk. Said conventional vision systems do not reach any safety level.

In additional to usual 2D cameras, 3D cameras are also known that record depth-resolved or three-dimensional image data also called a depth map. There are a number of 3D processes, for example stereoscopy based on human vision, triangulation processes with respect to an own projected illumination pattern, image sensors with time of light measurement in their pixels (ToF), or also laser scanners with scan mechanisms in two axes. The briefly presented vision systems with fiducial markers do not use any 3D image recording. The use of a 3D camera does not per se result in any safety level.

EP 1 933 167 B1 discloses an optoelectronic sensor for the detection and distance determination of an object both by means of stereoscopy and by means of a triangulation process using a projected illumination pattern with a subsequent comparison of the respective three-dimensional images. US 2011/025827 A1 generates a depth map by means of a pattern comparison of a projection pattern and stereoscopy. The paper by Um et al., "Three-dimensional scene reconstruction using multiview images and depth camera", Stereoscopic Displays and Virtual Reality Systems XII, Vol. 5664, SPIE, 2005, merges a 3D image of two stereocorrelations of a central image with a left image or with a right image. A camera system is presented in DE 10 2005 028 490 B4 that has a stereo camera and an additional color camera or infrared camera.

EP 3 734 423 A1 deals with the camera based localization of optically detectable markers. In this respect, a first and second localization detector is used and at least one of the results of the two detections is selected for the localization. Applications of safety engineering are not discussed and accordingly no proof is provided that a safety level in accordance with a safety standard has been reached. A structure of the markers corresponding to a fiducial marker is likewise not described.

US 2021/0383551 A1 deals with fiducial markers and their automatic detection in a multicamera system. The likelihood of locating a marker with a camera is increased by the multiple cameras. The reliability of the localization and pose determination by means of a marker that has been detected is not thereby increased and does not anyway reach a safety level in accordance with a safety standard.

SUMMARY

It is therefore the object of the invention to improve the localization of an optical marker.

This object is satisfied by a camera device and by a method for localizing an optical marker in accordance with the respective independent claim. The camera device has at least one image sensor with which images, preferably resolved in a plurality of pixels, can be recorded. A control and evaluation unit, for example at least one digital processing module, is able to read and to process image data. A first camera channel for recording first image data Is formed by the image sensor and the control and evaluation unit. The first image data can be a recording by the image sensor or processing results thereof, for example a depth map acquired by a stereo algorithm. The control and evaluation unit locates the optical marker in the first image data and determines a first pose of the optical marker, i.e. its position and orientation relative to the camera device. Depending on it being a mobile or stationary application, the goal here can be locating the actual pose of the camera device in space such as in navigation or the pose of a detected object such as a robot with respect to its environment. The basis in each case is the relative pose of the marker in the reference system of the camera device.

The invention starts from the basic idea of forming at least one second camera channel for generating second image data with the image sensor and the control and evaluation unit. Depending on the embodiment, the two camera channels use the same image sensor in different manners or different image sensors or combinations thereof. The result of the imaging process in the second camera channel is anyway a different one than in the first camera channel; the two camera channels are diverse or diverse-redundant. The evaluation of the second image data equally takes place in dependence on the embodiment in the same control and evaluation unit, in different regions, or in different digital processing modules. The evaluations are equally diverse or diverse-redundant, already as a result of the different imaging processes and preferably also beyond in a very targeted manner. This diversity relates to the evaluation process and/or to the underlying hardware. The control and evaluation unit locates the optical marker a second time, now in the second image data, and determines a second pose of the optical marker. What was explained in the previous paragraph with respect to the pose applies correspondingly here. The first pose and the second pose would agree perfectly in an ideal world. The control and evaluation unit compares the first pose and the second pose with one another. The expectation here is that the agreement is also practically achieved within predefined tolerances. An error has otherwise to be assumed in at least one of the camera channels and the reliability of the localization or of the pose determination is not given for at least this point in time. Depending on the embodiment, this is an indication or already a sufficient criterion for the fact that the functional safety is not ensured and a response can be derived therefrom in an application specific manner.

The invention has the advantage that a reliable or even a safe localization of optical markers and a pose determination based thereon are made possible. Safe or safety have the meaning here in the total description that demands of a safety standard for machine safety or functional safety have been met of which some have been named by way of example in the introduction. The camera channels used for this purpose can be superposed on practically every frequently used camera technology. Desired safety levels such as SILs (safety integrity levels) or PLs (performance levels) can be directly achieved by different camera channels and camera architectures and by different evaluations.

The optical marker preferably has at least three reference features of known positions within the optical marker. It is in particular a fiducial marker (fiducial, frame marker). The three reference features allow the pose determination in the manner of a tripod in that they determine a 2D geometry in space, with four or even more reference features preferably being provided for a redundant pose determination that is more robust overall. Fiducial markers are known per se and reference is additionally made to the compliance.

The control and evaluation unit is preferably configured to output a safeguarding signal to a monitored machine when the first pose and the second pose differ from one another beyond a tolerance. The tolerance can be specified spatially, i.e. in position and/or orientation, and/or in time. The camera device is here preferably used in the typical safety application for accident avoidance at a monitored machine, whether mobile such as at a vehicle or stationary such as for monitoring a robot. This machine is safeguarded when the two poses differ from one another in an intolerable manner and the reliability or safety of the pose determination is thus not ensured. The safeguarding can be application dependent, for example a slowing down, an evasion, or an emergency stop.

The control and evaluation unit is preferably configured to track the first pose and/or the second pose over time and to in particular take account of a prediction of a pose in the comparison of the first pose with the second pose. The history of the poses already makes possible a very precise prediction of the current pose without a repeat measurement. Corresponding object tracking processes, for example based on Kalman filters, are known per se. The predicted pose can be a further indicator for an error in one of the two camera channels if a pose incompatible with the prediction is determined there.

At least one camera channel preferably records color or monochrome two-dimensional image data and evaluates the two-dimensional image data. At least one camera channel is thus based in a very typical manner on two-dimensional camera images. Conventional processes such as AprilTag and the other vision systems described in the introduction can then be made use of for the localization of optical markers and for pose determination. The respective camera channel is itself not safe or it at least does not have to be; the higher reliability or safety is achieved by the combination with the other camera channel.

At least one camera channel preferably records three-dimensional image data in accordance with the stereoscopic principle and evaluates the three-dimensional image data. For this purpose, the camera device has at least two image sensors or individual cameras for generating two two-dimensional images recorded offset from one another perspectively. A depth map is generated from the respective image pairs by applying a stereo algorithm for estimating disparities of corresponding image features. The optical marker can be localized using the conventional processes in at least one of the two two-dimensional images. Which pixels of the depth map belong to the optical marker is thus known; the associated 3D position can then be seen from the depth map. The other camera channel uses at least one of the two image sensors or an additional separate image sensor.

At least one camera channel preferably records three-dimensional image data in accordance with the time of flight principle and evaluates the three-dimensional image data. This is an alternative three-dimensional imaging process. There are in particular special TOF (time of flight) chips that generate corresponding depth maps. Which pixels belong to the optical marker can be determined from the associated intensities and the associated 3D position can again be seen from the depth map.

The camera device is preferably formed as a monochrome stereo camera or as an RGB stereo camera having a monochrome image sensor or an RGB image sensor and two stereo image sensors for the stereoscopic capturing of two offset images, with the monochrome image sensor or the RGB image sensor being used in the first camera channel and the two stereo image sensors being used in the second camera channel. There are a total of three image sensors in this exemplary specific configuration of the camera device. An RGB or monochrome first camera channel and a stereoscopic second camera channel can thereby be combined with one another, with the fixed linguistic association with the first or second camera channel naturally being a swappable convention here as everywhere.

The camera device is preferably formed as a stereo camera having two stereo image sensors for the stereoscopic capturing of two offset images, with one of the stereo image sensors being used in the first camera channel and the two stereo image sensors being used in the second camera channel. There are only two image sensors in this alternative embodiment. Instead of a dedicated third image sensor for the recording of RGB or monochrome image data, at least one of the two stereo image sensors is used again in a dual function for this purpose. This has the advantage of a simpler design, but is less diverse and thus more robust than in the case of an additional third image sensor.

The camera device is preferably formed as a time of flight camera having ToF image sensor, with the first image data being generated from the intensities of the ToF image sensor and the second image data being generated from times of flight of the ToF image sensor. There is only a single image sensor in the form of the ToF image sensor in this embodiment. Both a monochrome image is thus generated from the intensities for the one camera channel and a depth map is generated form the times of flight for the other camera channel.

The camera device is preferably formed as a time of flight camera having a ToF image sensor and an additional monochrome image sensor or RGB image sensor, with the monochrome image sensor or RGB image sensor being used in the first camera channel and the ToF image sensor being used in the second camera channel. In this alternative embodiment, two image sensors are now provided, with the additional image sensor delivering the RGB or monochrome image. A somewhat more complex design of the camera device is thus admittedly produced, but diversity and thus robustness are in turn increased.

The camera device preferably has at least one image sensor per camera channel, with the image sensors of different camera channels being formed as diverse with respect to one another, in particular differing from one another in their number of pixels, their pixel size, their pixel pattern, their pixel design, or their fixed pattern noise. Even though there are embodiments in which the camera channels share an image sensor, the use of at least one image sensor per camera channel has the advantage that a higher diversity and thus safety level can be reached. The most varies properties of the image sensors or of their pixels are available for this that can be varied between the image sensors.

The control and evaluation unit is preferably configured for a mutual calibration of the camera channels in which the first pose and the second pose are made congruent with one another at least at times. A systematic difference of the two poses is thus corrected that is not due to errors in a camera channel, but is rather based on different starting conditions of the camera channels. The calibration can be repeated, for example cyclically, at random points in time, or after too great a drifting apart. The drifting apart is advantageously monitored. A uniform drifting apart can be tolerated at least within certain limits, with the monitored drift being able to be taken into account in the comparison of the two poses, whereas jumps indicate an error in one of the camera channels.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
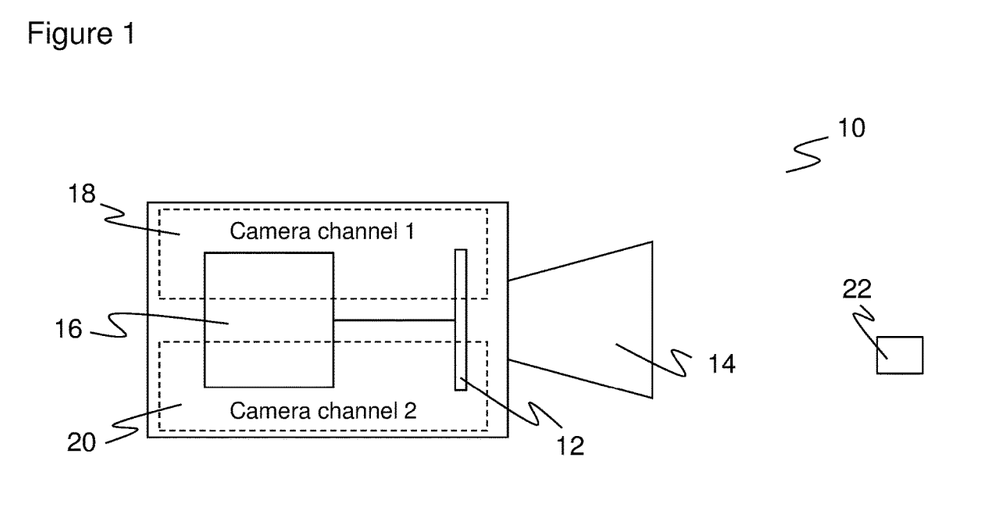
FIG. 1 a block diagram of a camera device with two camera channels.

FIG. 1 shows a block diagram of a camera device 10. At least one image sensor 12, which is preferably designed as a matrix-type recording chip and records a rectangular pixel image, for example a CCD or a CMOS sensor, is provided therein. An objective 14 only indicated very schematically and having an imaging optics is associated with the image sensor 12 which in practice can be implemented as any known imaging objective. Optionally, an illumination is provided, not shown, to illuminate the detection zone or to project a structured pattern into the detection zone.

A control and evaluation unit 16 is connected to the image sensor 12 and reads and processes image data. The control and evaluation unit 16 can be implemented in the most varied hardware, for example in one or more digital modules such as microprocessors, ASICs (application specific integrated circuits), FPGAs (field programmable gate arrays), GPUs (graphics processing units) or mixed forms thereof. It can be implemented internally in the camera device 10, but also at least partially externally, in particular on an edge device or in a cloud, and can preferably have an at least partially parallel architecture.

A first camera channel 18 and a second camera channel 20 are formed by the image sensor 12 and the control and evaluation unit 16. The first camera channel thus records first image data and the second camera channel 20 records second image data and evaluates them respectively. The aim of this evaluation is the localization of at least one optical marker 22 that is in particular a fiducial marker. The relative pose of the camera device 10 relative to the optical marker 22 and thus the pose of the object having the marker 22 in the reference system of the camera device is determined with the aid of the optical marker 22. This takes place separately and diverse-redundantly in both camera channels 18, 20. Whether the pose determination is reliable or safe can subsequently be determined by a comparison of the first pose from the first camera channel 18 and the second pose from the second camera channel 20.

The representation of the two camera channels 18, 20 is to be understood very abstractly. Camera channels 18, 20 can use an image sensor 12 together, can respectively have at least one image sensor 12 of their own, or can use a plurality of image sensors 12 in partially overlapping groups. This applies in a similar manner to modules or functions of the control and evaluation unit 16. The camera channels 18, 20 can, as shown, form a common camera, but equally also separate cameras having their own objectives and/or housings. Different embodiments of the camera channels 18, 20 will be explained in more detail with reference to FIGS. 4 and 9 to 11.

The camera device 10 is preferably used in a safety engineering application for monitoring a machine and for accident avoidance, in particular with persons, and is configured for this purpose as safe in the sense of relevant safety standards explained in the introduction. It reaches a certain safety level such as SIL or PD, in particular thanks to the two camera channels 18, 20. The increased reliability is, however, also of advantage outside safety engineering. The object in a safety engineering application is to recognize in good time when an object or a person or a body part comes close to a hazardous machine part. This can be recognized, for example, by correspondingly configured protected fields that may be understood illustratively as a kind of virtual wall or a speed dependent minimum distance is required (speed and separation monitoring). If a hazardous situation is recognized, a safety related safeguarding signal is output, in particular over a safe output (OSSD, output signal switching device). The monitored machine is accordingly slowed down, evades, or triggers an emergency stop.

A plurality of camera devices 10 can be provided that have agreed on a common coordinate system to enable detections from different perspectives, to achieve a larger field of vision in which the optical marker 22 is not lost, and to avoid shading problems.

Figure 2:
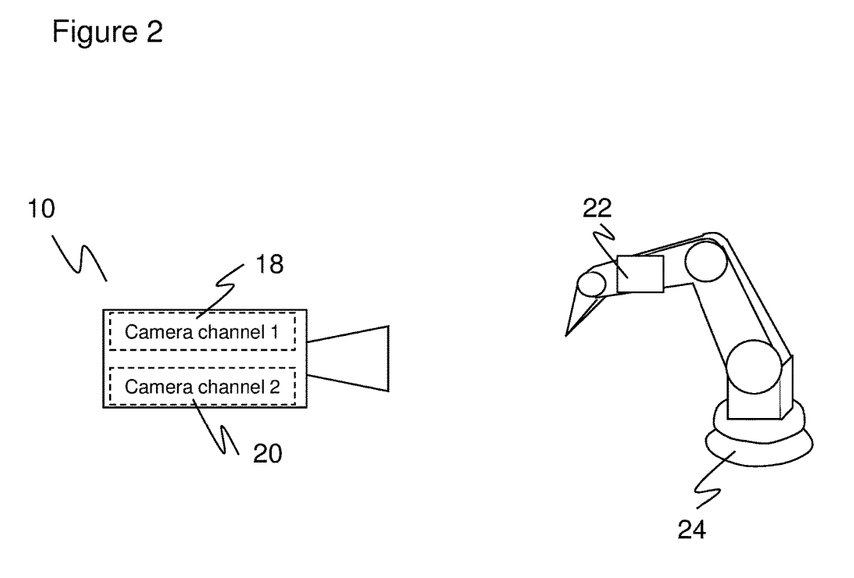
FIG. 2 a schematic representation of the determination of a robot pose using an optical marker by a camera device.

FIG. 2 shows an exemplary application situation of the camera device 10. The optical marker 22 is here attached to a robot 24 whose pose is determined. Differing from the representation, an optical marker 22 is possible at different limbs of the robot 24, in particular at its end effector or at a plurality of limbs. The robot movements are monitored by identification, pose determination, and optionally also tracking over time. The reliable, preferably safe pose determination by the two camera channels 18, 20 enables a safe human robot collaboration (HRC). In addition or to reach even higher safety levels, the camera device 10 can validate the kinematics or forward kinematics determined in the robot control that are typically based on simple sensor measurements, for instance of rotary encoders in the robot joints, and that cannot alone satisfy any sufficient safety demands.

Figure 3:
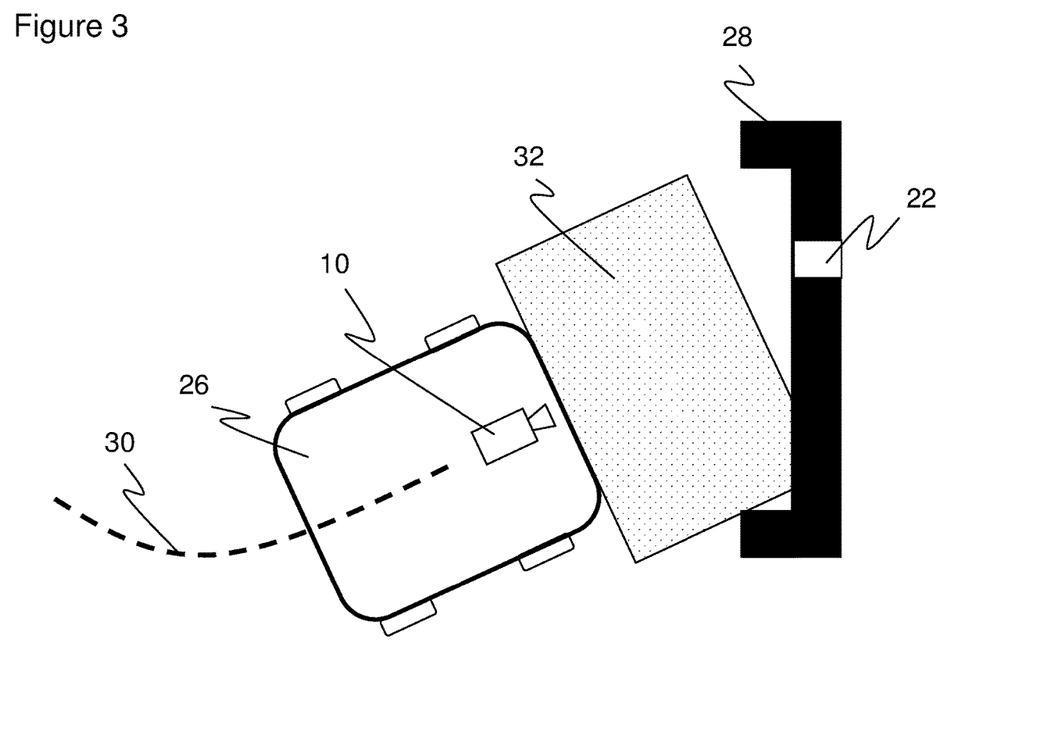
FIG. 3 a schematic representation of the determination of a vehicle pose using an optical marker by a co-moved camera device.

FIG. 3 shows a further exemplary application situation, now a mobile one, of the camera device 10 with a determination of the pose of a vehicle 26 at which the camera device 10 is installed in a co-moving manner. It is in particular an autonomous vehicle 26 such as an autonomous mobile robot. The optical marker 22 is here attached to the surrounding infrastructure, to a charging station 28 by way of example. The pose of the vehicle 26 reliably determined by the two camera channels 18, 20 enables a precise navigation to the charging station 28 and a parking at the charging station 28. The previous vehicle is indicated as a dashed line of the trajectory 30. Beyond the actual navigation, the camera device can safeguard the vehicle 26, represented by a protected field 32 here. The protected field 32 is preferably adapted during the parking to prevent surrounding objects such as parts of the charging station 28 from triggering an unwanted protected field infringement. The pose determined with the optical marker 22 serves to repeatedly and iteratively adapt the respectively required protected field 32 during the approach movement. In a similar manner, optical markers 22 can support the navigation and preferably the safeguarding at any desired points independently of a charging station 28.

Figure 4:
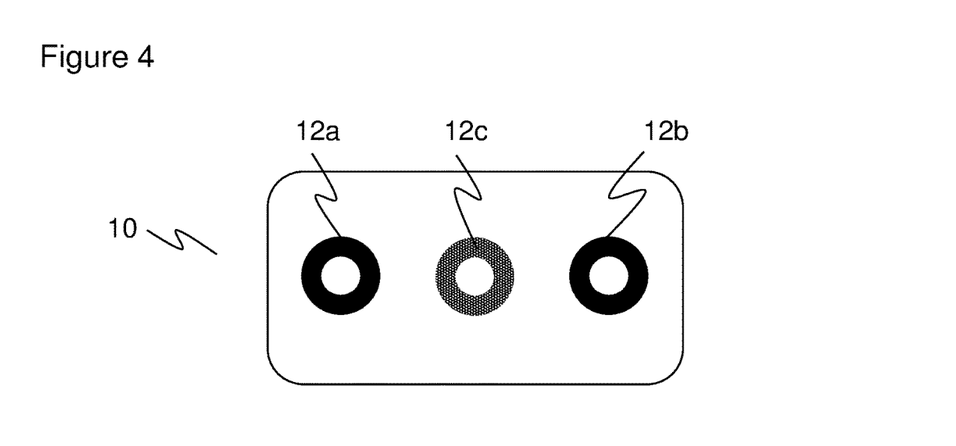
FIG. 4 a schematic representation of a camera device with two stereo image sensors and a monochrome or RGB image sensor.

FIG. 4 is a schematic representation of an embodiment of the camera device having two stereo image sensors 12*a-b* and one monochrome or RGB image sensor 12*c*. The stereo image sensors 12*a-b* can have a global shutter and be monochrome; the monochrome or RGB image sensor can have a global shutter or a rolling shutter. The image sensors 12*a-b*, 12*c* can differ from one another in further features, except for their shutters or exposure mechanisms, to increase the diversity. Such differences can be found in the number of pixels, the pixel size, the pixel errors, or in different electronic pixel architectures. The image sensors 12*a-c* furthermore have a so-called fixed pattern noise (FPN), with DSNU (dark signal non-uniformity) and PRNU (photoresponse non-uniformity) being able to be distinguished here. Increased diversity due to differences in the image sensors 12 of the two camera channels 18, 20 accordingly applies equally to the general representation with reference to FIG. 1 and to the further embodiments presented below with reference to FIGS. 9 to 11. The slightly different perspectives of the image sensors 12*a-c* in the camera channels 18, 20 also contribute to the diversity.

In the embodiment in accordance with FIG. 4, without any restriction of generality, the stereo image sensors 12*a-b* form the first camera channel 18 while the monochrome or RGB image sensor 12*c* forms the second camera channel 20. Three-dimensional image data or a depth map is determined in the first camera channel 18 from the two starting images of the stereo image sensors 12*a-b* with the aid of a stereoscopic disparity estimation. One of the two starting images of the stereo image sensors 12*a-b* can additionally be used to identify those pixels that are to be attributed to the optical marker 22. Its 3D position is then known from the depth map so that the pose can be determined. Two-dimensional evaluations that are known per se and that recognize the optical marker 22 with reference to its contrast, its pattern, or specifically its reference features can be used for the localization of the optical marker 22 in the starting images. Only two-dimensional evaluations are required overall in the second camera channel; use is preferably made here of vision systems such as AprilTag. AprilTag and comparable vision systems can also be used in the first camera channel 18 to locate the pixels in the starting images belonging to the optical marker 22.

A diverse image detection, localization of the optical marker 22, and position determination of the optical marker 22 with respect to the camera device 10 is thus produced overall. Due to the heterogeneity, a high safety level can be reached (SIL in accordance with IEC/EN 61508 or PD in accordance with IEC/EN 13849) using the embodiment in accordance with FIG. 4 based on two image sensors 12*a-b* in a first stereoscopic camera channel 18 and on an additional image sensor 12*c* in a second monochrome or RGB camera channel 20.

The stereoscopic detection can take place passively. In the alternative case of active stereoscopy, a structured pattern is projected to also generate robust correspondences in homogeneous scenes and so to be able to detect denser depth maps. In this case, measures are preferably taken so that the projected structured pattern does not interfere with the monochrome or RGB recording of the additional image sensor 12*c*. They include a bandpass filter that filters the wavelength of the illumination or a time multiplexing of the recordings with intermittently switched off illumination.

Figure 5:
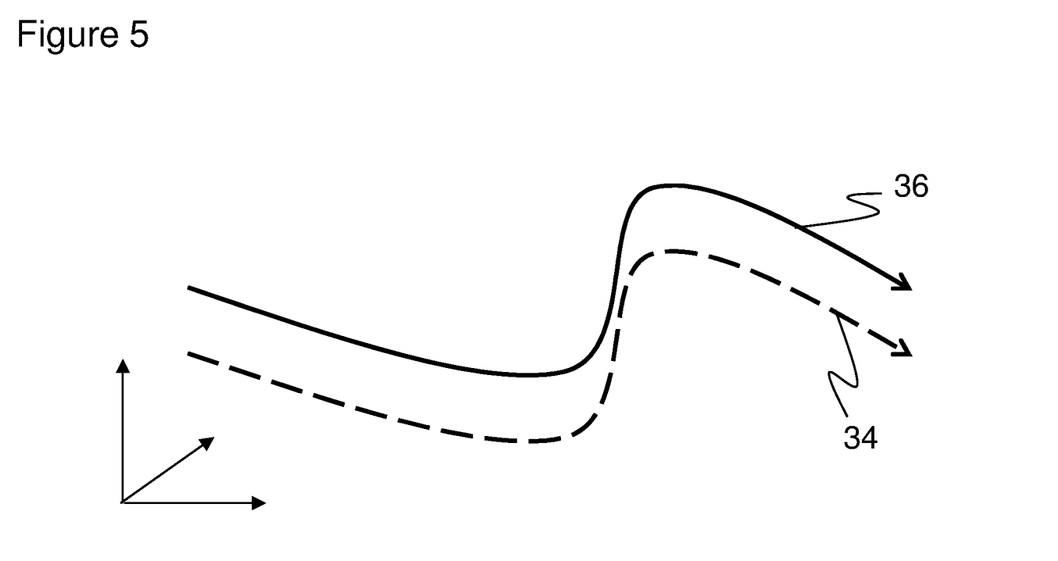
FIG. 5 an illustration of the offset between the poses determined in an RGB camera channel and a stereo camera channel.

FIG. 5 shows an illustration of the offset between the poses in the two camera channels 18, 20 over time. The positions or the trajectories generated therefrom are shown as representative, and indeed that of the first stereoscopic camera channel 18 by a dashed line 14 and that of the second monochrome or RGB camera channel 20 by a solid line 36. The example shown thus relates to the embodiment in accordance with FIG. 4, but similar effects are shown in other designs of the camera channels 18, 20.

Figure 6:
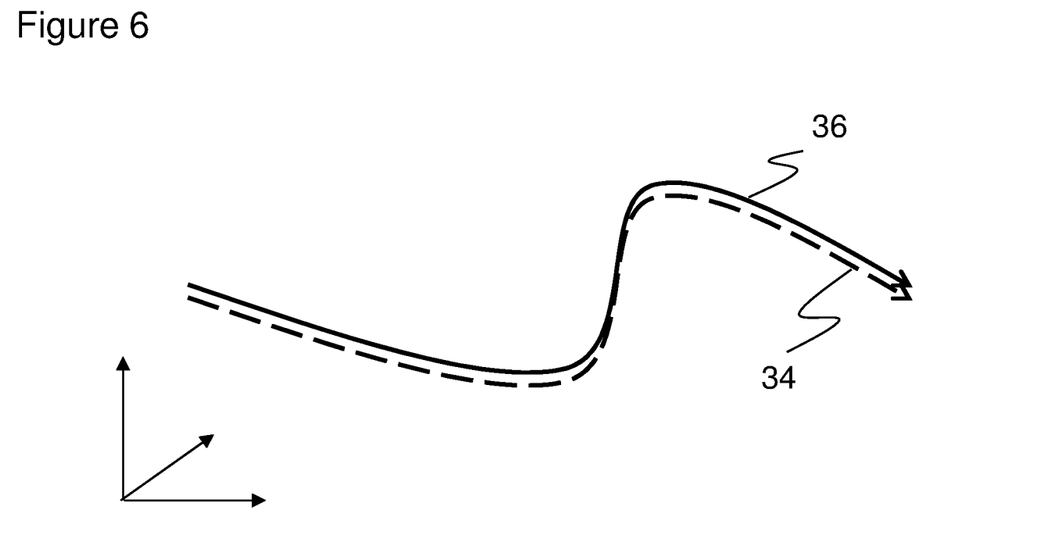
FIG. 6 an illustration of the offset compensated by calibration in accordance with FIG. 5.

An initial difference between the camera channels 18, 20 continues over time. It is therefore advantageous to carry out a compensation of the systematic differences, in particular by an initial calibration. This preferably incudes a calibration of the image sensors 12a-c, of the objectives 14, and of the installation position to become aware of the intrinsic and extrinsic camera parameters. Initial systematic differences can thus then be corrected. The offset in the X direction that is based on the parallaxes due to the lateral offset of the image sensors 12a-c is also covered by this here. FIG. 6 illustrates the offset compensated by calibration that consequently brings the two trajectories 34, 36 of FIG. 5 into congruence within residual errors.

Figure 7:
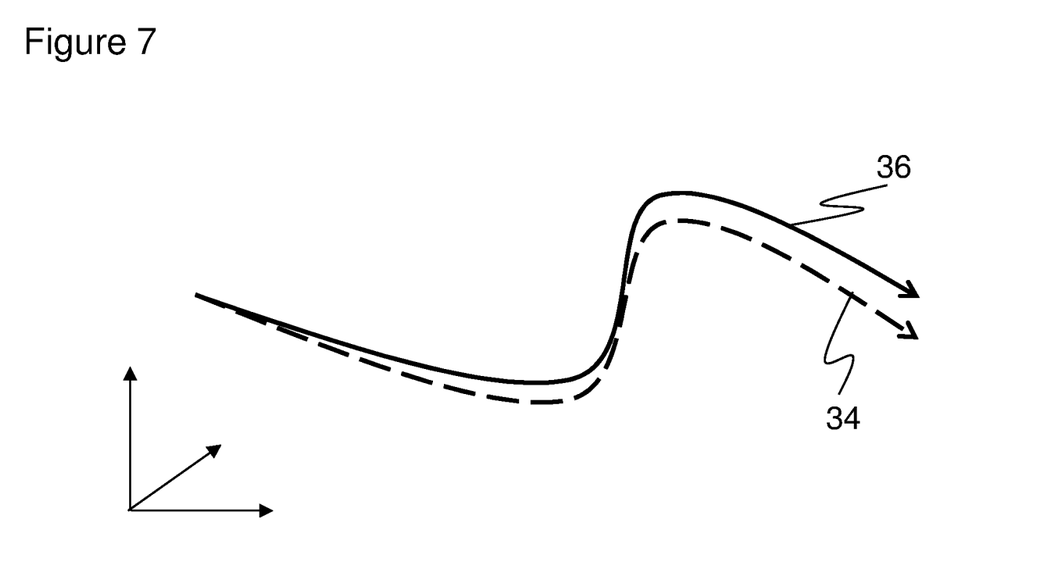
FIG. 7 an illustration of the drifting apart of the poses determined in an RGB camera channel and a stereo camera channel despite initial calibration.

FIG. 7 shows an illustration of the drifting apart of the trajectories 34, 36 despite an initial calibration. As long as the drifting apart takes place gradually and evenly, it can be considered as non-critical so that the permitted tolerance in the cross-comparison of the poses from the two camera channels 18, 20 can be increased on the drifting apart. Abrupt drifting apart in contrast indicates an error. Alternatively, the camera device 10 can strictly require that the poses are congruent within predetermined tolerances, irrespective of the source of the difference and of a portion that would be explained by drifting apart.

Figure 8:
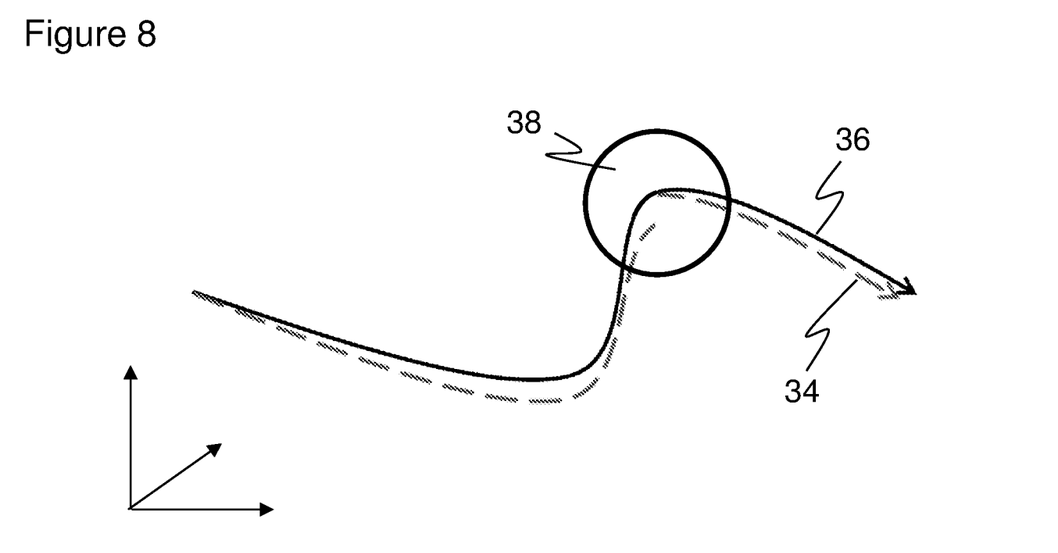
FIG. 8 an illustration of the repeat compensation of the drifting apart in accordance with FIG. 7 by a repeat calibration or resetting of the calculation.

FIG. 8 illustrates a possible repetition of the calibration at a time marked by a circle 38. This can take place cyclically, at fixed times, or even randomly, or whenever the drifting apart exceeds a threshold value. Alternatively to a repeat calibration, the calculation can be reset, i.e. both poses are artificially placed over one another again, either to the value from one of the camera channels 18, 20 or from a calculation such as the mean value.

Figure 9:
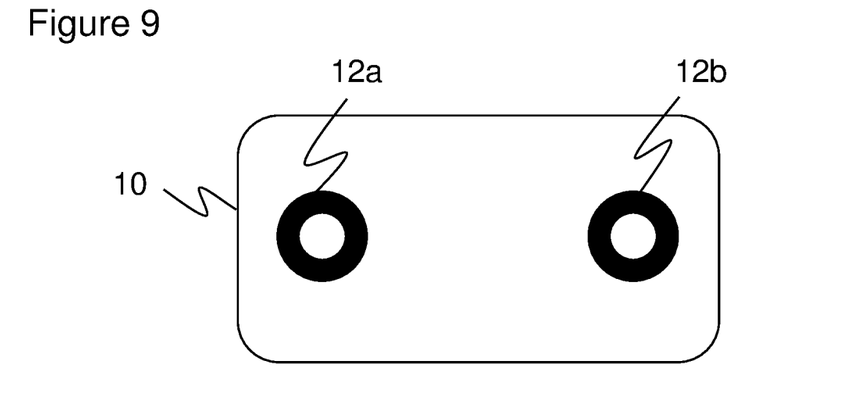
FIG. 9 a schematic representation of a camera device with two stereo image sensors without an additional monochrome or RGB image sensor.

FIG. 9 shows a schematic representation of a further embodiment of the camera device 10 that now in contrast to FIG. 4 has two stereo image sensors 12a-b without an additional monochrome or RGB image sensor. The first stereoscopic camera channel 18 can furthermore be passive or active. The second camera channel 20 is here formed by one of the two stereo image sensors 12a-b so that the respective stereo image sensor 12a-b has a dual function. The simpler overall design without an additional monochrome or RGB image sensor results in less heterogeneity or diversity. An only average safety level such as SIL or PD thus tends to be reached.

Figure 10:
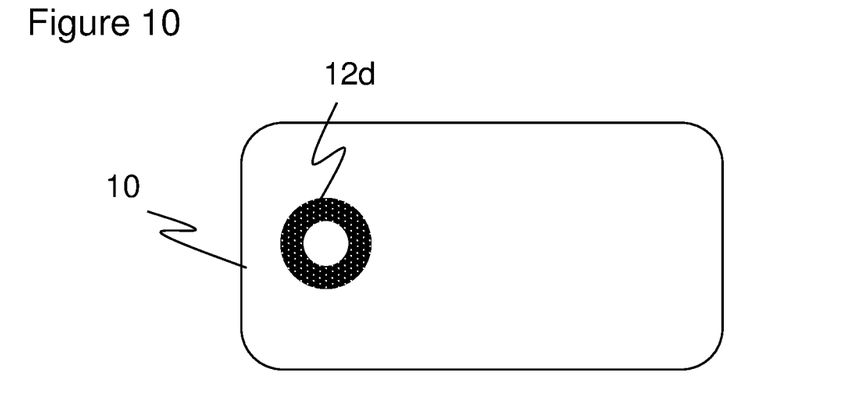
FIG. 10 a schematic representation of a camera device with a ToF sensor.

FIG. 10 shows a schematic representation of a further embodiment of the camera device 10 having a TOF sensor 12d. There is thus only one single image sensor in total in this embodiment. TOF image sensors available on the market can at the same time generate high quality depth maps by means of time of flight processes and gray value images from the respective intensity. The depth maps and gray scale images are automatically correctly aligned with one another since the same pixels form the basis. The pose of the optical marker 22 can in turn be reconstructed from the gray scale images in a conventional manner, for example using AprilTag or another vision system named in the introduction. The depth maps enable a direct determination of the 3D positions with a completely different process, namely the time of flight process. Only comparatively low safety levels are nevertheless achieved because all the image data are produced by the same image sensor 12d.

Figure 11:
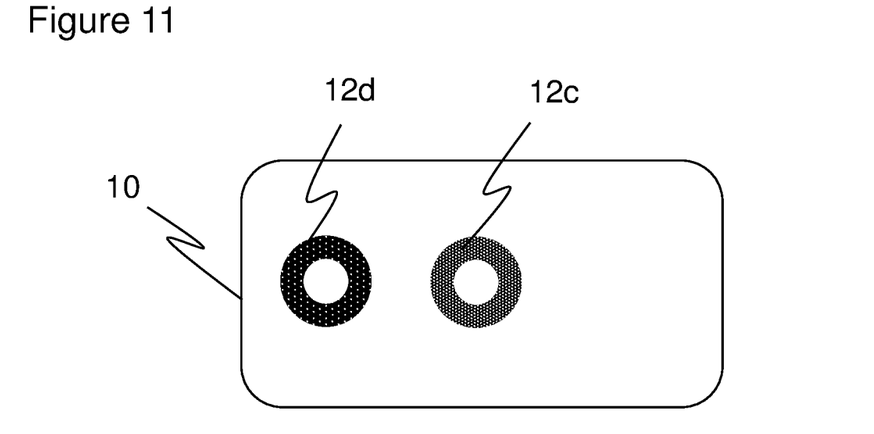
FIG. 11 a schematic representation of a camera device with a ToF image sensor and an additional monochrome or RGB image sensor.

FIG. 11 shows a schematic representation of a further embodiment of the camera device 10 that now unlike the embodiment in accordance with FIG. 10 has an additional monochrome or RGB image sensor 12c in addition to the TOF image sensor 12d. The diversity is thereby again extended over the total camera channels 18, 20. Medium to high safety levels can now be achieved.

The invention claimed is:

1. A camera device for localizing an optical marker, wherein the camera device has at least one image sensor and a control and evaluation unit, wherein a first camera channel for recording first image data having the optical marker is formed from the at least one image sensor and the control and evaluation unit and the control and evaluation unit is configured to locate the optical marker in the first image data and to determine a first pose of the optical marker relative to the camera device, wherein the optical marker has at least three reference features of known positions within the optical marker, and wherein a second camera channel for recording second image data having the optical marker is formed from the at least one image sensor and the control and evaluation unit; and wherein the control and evaluation unit is configured to locate the optical marker in the second image data, to determine a second pose of the optical marker relative to the camera device, and to compare the first pose and the second pose with one another and to output a safeguarding signal to a monitored machine when the first pose and the second pose differ from one another beyond a predetermined tolerance.

2. The camera device in accordance with claim 1, wherein the optical marker has at least three reference features of known positions within the optical marker.

3. The camera device in accordance with claim 1, wherein the control and evaluation unit is configured to track the first pose and/or the second pose over time.

4. The camera device in accordance with claim 3, wherein the control and evaluation unit is configured to take account of a prediction of a pose in the comparison of the first pose with the second pose.

5. The camera device in accordance with claim 1, wherein at least one camera channel records color or monochrome two-dimensional image data and evaluates the two-dimensional image data.

6. The camera device in accordance with claim 1, wherein at least one camera channel records three-dimensional image data in accordance with the stereoscopic principle and evaluates the three-dimensional image data.

7. The camera device in accordance with claim 1, wherein at least one camera channel records three-dimensional image data in accordance with the time of flight principle and evaluates the three-dimensional image data.

8. The camera device in accordance with claim 1, wherein the camera device is formed as a monochrome stereo camera or as an RGB stereo camera having a monochrome image sensor or an RGB image sensor and two stereo image sensors for the stereoscopic capturing of two offset images, with the monochrome image sensor or the RGB image sensor being used in the first camera channel and the two stereo image sensors being used in the second camera channel.

9. The camera device in accordance with claim 1, wherein the camera is formed as a stereo camera having two stereo image sensors for the stereoscopic capturing of two offset images, with one of the stereo image sensors being used in the first camera channel and the two stereo image sensors being used in the second camera channel.

10. The camera device in accordance with claim 1, wherein the camera device is formed as a time of flight camera having a Time of Flight (ToF) image sensor, with the first image data being generated from intensities of the ToF image sensor and the second image data being generated from times of flight of the-FGE ToF image sensor.

11. The camera device in accordance with claim 1, wherein the camera device is formed as a time of flight camera having a Time of Flight (ToF) image sensor and an additional monochrome image sensor or RGB image sensor, with the monochrome image sensor or RGB image sensor being used in the first camera channel and the ToF image sensor being used in the second camera channel.

12. The camera device in accordance with claim 1, wherein the camera device has at least one image sensor per camera channel, and wherein the image sensors of different camera channels are formed as diverse with respect to one another.

13. The camera device in accordance with claim 12, wherein the camera device has at least one image sensor per camera channel, and wherein the image sensors of different camera channels differ from one another in the number of their pixels, their pixel size, their pixel pattern, their pixel design, or their fixed pattern nose.

14. The camera device in accordance with claim 1, wherein the control and evaluation unit is configured for a mutual calibration of the camera channels in which the first pose and the second pose are made congruent with one another at least at times.

15. A method of localizing an optical marker using a camera device, wherein first image data are recorded and evaluated in a first camera channel to locate the optical marker in the first image data and to determine a first pose of the optical marker relative to the camera device, and wherein second image data are recorded and evaluated in a second camera channel to locate the optical marker in the second image data and to determine a second pose of the optical marker relative to the camera device; and wherein the first pose and the second pose are compared with one another and to output a safeguarding signal to a monitored machine when the first pose and the second pose differ from one another beyond a predetermined tolerance.

16. The method in accordance with claim 15, wherein the camera device has at least one image sensor and a control and evaluation unit, wherein the first camera channel for recording first image data having the optical marker is formed from the at least one image sensor and the control and evaluation unit and the control and evaluation unit is configured to locate the optical marker in the first image data and to determine the first pose of the optical marker relative to the camera device, wherein the second camera channel for recording second image data having the optical marker is formed from the at least one image sensor and the control and evaluation unit; and wherein the control and evaluation unit is configured to locate the optical marker in the second image data.

17. The method in accordance with claim 15, wherein the optical marker comprises fiducial marker.

18. A camera device for localizing an optical marker, wherein the camera device has at least one image sensor and a control and evaluation unit, wherein a first camera channel for recording first image data having the optical marker is formed from the at least one image sensor and the control and evaluation unit and the control and evaluation unit is configured to locate the optical marker in the first image data and to determine a first pose of the optical marker relative to the camera device, and wherein a second camera channel for recording second image data having the optical marker is formed from the at least one image sensor and the control and evaluation unit; and wherein the control and evaluation unit is configured to locate the optical marker in the second image data, to determine a second pose of the optical marker relative to the camera device, and to compare the first pose and the second pose with one another and to output a safeguarding signal to a monitored machine when the first pose and the second pose differ from one another beyond a predetermined tolerance.

19. The method in accordance with claim 18, wherein the optical marker comprises fiducial marker.

\* \* \* \* \*